United States Patent [19]
Smith et al.

[11] Patent Number: 5,465,490
[45] Date of Patent: Nov. 14, 1995

[54] RESCUE CHOPPING TOOL

[75] Inventors: Walter C. Smith, Ridgecrest; Thomas R. Mooney, Rancho Palos Verdes, both of Calif.

[73] Assignee: Hi-Shear Technology Corporation, Torrance, Calif.

[21] Appl. No.: 142,664

[22] Filed: Oct. 25, 1993

[51] Int. Cl.⁶ .................................................. B26B 17/00
[52] U.S. Cl. ................................................ 30/180; 30/182
[58] Field of Search ............................. 30/175, 180, 194, 30/228, 278, 272.1, 277.4, 182

[56] References Cited

U.S. PATENT DOCUMENTS

| | | | |
|---|---|---|---|
| 3,257,724 | 6/1966 | Wilterdink et al. | 30/180 |
| 3,393,605 | 7/1968 | Parnell | 30/180 |
| 4,062,112 | 12/1977 | Lake | 30/228 |
| 4,506,445 | 3/1985 | Esten | 30/228 |
| 5,105,543 | 4/1992 | Maarschalk et al. | 30/228 |

*Primary Examiner*—Hwei Siu Payer
*Attorney, Agent, or Firm*—Donald D. Mon

[57] ABSTRACT

A cutting type rescue tool having a body with an axis of actuation. A spacer on the body spaces a reaction arm, which reaction arm extends across the axis. An actuator barrel contains a piston from which a piston rod extends to a cutting blade that faces the reaction arm. The actuator barrel is slidably mounted in the body and is retained thereto. Braking shoulders on the actuator barrel and on the body oppose a decelerator device which reduces impact forces between the actuator barrel and the body, after the piston bottoms on the actuator barrel.

7 Claims, 1 Drawing Sheet

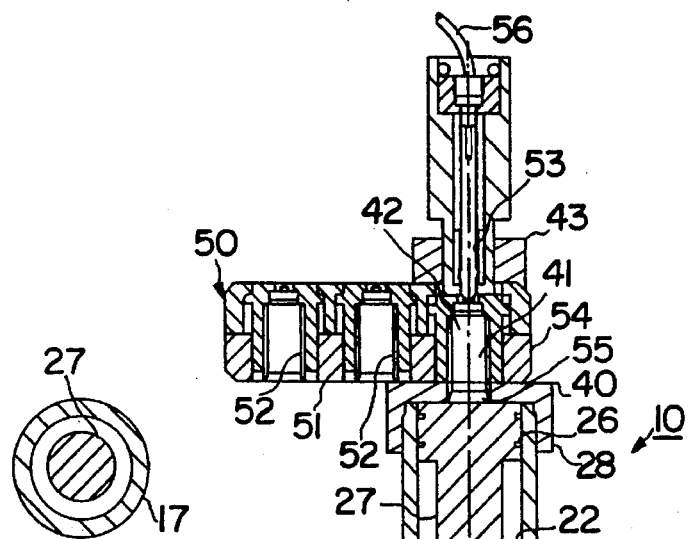
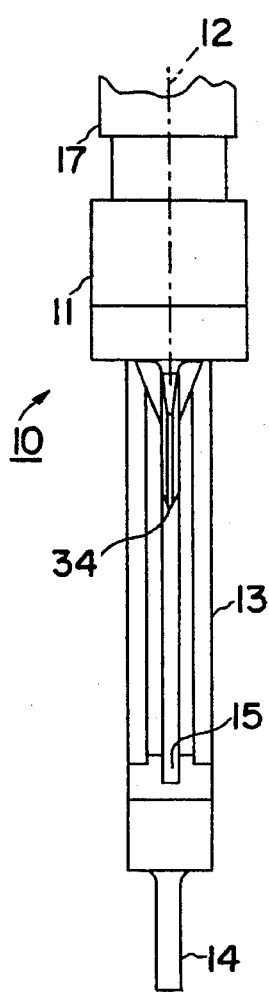
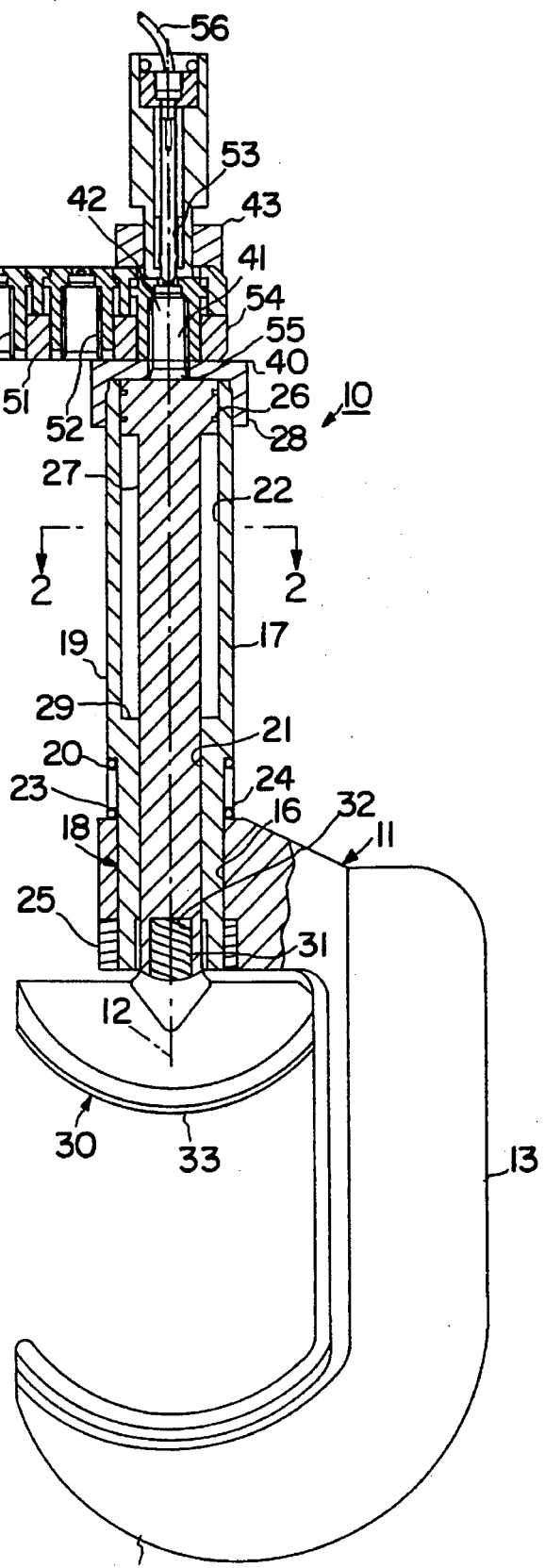
FIG. 2
FIG. 3
FIG. 1

RESCUE CHOPPING TOOL

FIELD OF THE INVENTION

A rescue tool for chopping heavy structure, using gas-powered cutting blows, preferably powered by a gas-generating cartridge.

BACKGROUND OF THE INVENTION

In the aftermath of automotive and aircraft crashes, occupants are frequently trapped inside deformed metal structures which are too strong merely to be pulled to one side. Instead, portions of these structures must be removed or strongly bent to enable the occupants to be rescued.

Because very large forces are required for this purpose, it is common to use devices powered by pressurized hydraulic fluid as an energy source. Such a system must include an engine, a pump, a reservoir, and connecting hoses and fittings. All of these are weighty and cumbersome. They complicate the use of the device, and require considerable maintenance. Their life between overhauls is limited by their seals. They do provide the advantage that they can be used either as a spreader to spread portions of the structure apart, or to pull them together, although the former is nearly always preferred.

As to maintenance and life between overhauls, it is instructive to learn that these devices are used many more times in training exercises than they are in rescues. It is not uncommon for a device to be used in training or demonstrations one hundred times, and in rescues only a few times. Frequently, the uses in training will wear out the tool before it is used in an emergency. Obviously hydraulic tools have substantial inherent disadvantages.

If structure is merely to be spread apart by bending it, a steady separative force such as can be exerted by a hydraulically actuated tool is useful, and for that action is sometimes preferred to a percussive force. However, this requires considerable repositioning of the tool and multiple passes with it. This is clumsy and time-consuming when time cannot be affordable. As a consequence, cutting has frequently been suggested as an alternative, so that interfering structure can quickly be removed. Power saws can be used in a cutting mode such as by a rotary saw when there is no fire or explosion risk, but these also require a motor means such as a piston engine or an electrical generator, again an inconvenience or worse.

Another conventional method to remove interfering metal is to chop it away. Firemen have used axes for this purpose for decades. When it is tolerable, it is often preferred for its quickness, because an abrupt high-unit loading chopping force is considerably more effective than bending or sawing. Still, with persons trapped inside only inches away, strong unreacted chopping forces such as are exerted by axes, can rarely be tolerated.

It is an object of this invention to provide a chopping-type rescue tool whose power is totally self-contained, and which exerts its cutting force in a closed system wherein much, even most, of the impact shock is reacted by the body of the tool and by the structure being cut.

It is another object of this invention to provide a tool which can be actuated without contact with a structure to be cut in the sense of being fired "in the air", without causing damage to the tool or to anything surrounding it.

It is yet another object to provide such a tool with gas generating means which exerts a rapidly peaking high gas pressure to drive a chopping blade.

BRIEF DESCRIPTION OF THE INVENTION

A rescue tool according to this invention has a body with an axis of actuation. A spacer on the body extends axially, laterally spaced from the axis. A reaction arm extends laterally from the spacer, and crosses the axis.

An actuator barrel fits in an axially extending bore in the body. The barrel includes an axial cylinder which opens toward the reaction arm. A chopper comprises a shaft slidably fitted in the barrel, and a blade which faces toward, and is generally parallel to, the reaction arm.

A piston-piston rod assembly is fitted in the cylinder. It is drivingly connected to the chopper shaft.

A source of pressurized gas is connected to the barrel to discharge gas into the cylinder against the piston on its side away from the chopper. Pressurized gas supplied to the cylinder drives the piston and the chopper to chop structure held between the chopper and the reaction arm.

According to a preferred but optional feature of the invention, the gas source is a propellant charge, preferably provided in a replaceable cartridge.

Accordingly to yet another preferred but optional feature of the invention, an internal shoulder is formed in the cylinder wall where, after the rod has been suitably extended, the piston will strike the shoulder, transferring some of its kinetic energy to the barrel. The barrel is axially shiftable in the bore in the body, and resilient decelerator means is disposed between an external shoulder on the barrel and the body, whereby the barrel will be decelerated, further to reduce the impact shock of the barrel-piston combination when and if it strikes the body.

The above and other features of this invention will be fully understood from the following detailed description and the accompanying drawings, in which:

BRIEF DESCRIPTION OF THE DRAWINGS

FIG. 1 is a plan view, partly in axial cutaway cross-section, showing the presently-preferred embodiment of the invention;

FIG. 2 is a cross-section taken at line 2—2 in FIG. 1; and

FIG. 3 is a partial sideview of the embodiment of FIG. 1.

DETAILED DESCRIPTION OF THE INVENTION

A chopping tool 10 according to the invention is shown in FIG. 1. It includes a body 11 having an axis 12 of actuation. A spacer 13 is offset from the axis and extends axially away from the body. A reaction arm 14 extends from the spacer, laterally relative to the axis, and crossing it. The reaction arm optionally has a groove 15 facing toward the body for a purpose which will be disclosed.

The body has an axial bore 16. A barrel 17 has a reduced external section 18 which fits in the bore. An enlarged external section 19 forms a braking shoulder 20 which faces the body. A cylindrical internal rod guide section 21, and an internal cylinder 22 extend axially in the barrel.

A decelerator spring (sometimes called a "braking means") 23 fits around section 18 and is captive between braking shoulder 24 on the body and braking shoulder 20 on the barrel. It is compressed when shoulder 20 moves toward braking shoulder 24. A retainer 25 is threaded to section 18 to keep the barrel captive to the body.

A piston 26 is slidably fitted in cylinder 22, and a piston rod 27 extends from it, fitting slidably in rod guide section 21. Piston rings 28 form a sliding fit for the piston. Cylinder 22 is stepped to form a transfer shoulder 29 which can be contacted by the piston. It limits the travel of the piston and piston rod relative to the barrel.

A chopper 30 includes a stud 31 which fits in a socket 32 in piston rod 27. It abuts the piston rod, and is preferably removably secured to it. A chopper blade 33 is fixed to the stud. It has a cutting edge 34 which preferably is tapered to a point. Its taper faces groove 15 in the reaction arm. They are parallel to one another, and are axially aligned so as to chop a structure placed between them. Removability of the chopper from the rod facilitates assembly of the device, and the routine replacement of worn blades.

The reaction arm and chopper may have many different shapes. They may for example be scalloped or curved to discourage the structure from moving sidewardly out of the cutting region. A straight blade and a straight reactor arm will be the preferred shape for general usage.

A cylinder head 40 is fixed to the barrel, preferably by a threaded joinder. This gives access to the piston for repair. It includes a cartridge chamber 41 to receive a cartridge 42 with a charge that will generate gas. A breech closure 43 is removably fitted to the cylinder head. It enables access to the chamber to remove and replace cartridges.

The breech closure may be threaded to the cylinder head by a thread. For single shot usage, a bayonet connection will be preferred for quick removal and replacement for inserting a new cartridge.

The breech closure can also be adapted for multiple shots by providing a magazine 50 by which a plurality of cartridges are supplied one after another. Magazine arrangement such as are used in revolvers or automatic pistols can also be used. A straight bar 51 with a plurality of cartridge chambers 52 which can sequentially be placed in position by moving the bar laterally is a useful example of simple means to provide for repetitive shots.

The closure may be threadedly attached to the barrel (the magazine sliding through a lateral passage). Firing means 53 force the cartridge holder 54 as closely to the top of the retracted piston as possible to reduce the latent volume 55 of above the piston. This assures maximum initial gas pressure from detonation of the cartridge.

Firing means 56 may be of any suitable variety. If the charge includes an initiator, a typical firing pin (not shown) may be used. An exploding bridge wire may also be used. However, a laser source 56, schematically shown in FIG. 1 will often be preferred. Laser energy discharged directly into the charge is a very simple firing means.

The preferred charge is a solid propellant such as black powder. More sophisticated charges may be used instead, such as are used in separation systems for fasteners. However, conventional black powder has ample gas-generating capacity, and is stable and economical. It generally will be preferred.

In operation, the tool in its retracted condition as shown in FIG. 1 is brought against structure to be chopped. The tool is positioned so that the structure is in the region between the reaction arm and the chopper. The cartridge is then fired.

The high pressure gases rapidly accelerate the piston, piston rod, and chopper to chop the structure. During this movement the gas forces and the bias of the decelerator spring will hold the barrel in the illustrated retracted condition, and when substantially all of the energy is dissipated in the blow against the structure, it will stay there, and the piston will not bottom out on transfer shoulder 29.

However, if there is nothing between the blade and the reaction arm, or if there is so little between them that substantial kinetic energy remains in the chopper after the structure is chopped, the piston can bottom out sharply on the shoulder. If precautions were not taken, the piston would be destroyed by only a few such events. The construction of this device provides for these situations.

This invention reduces the impact stresses on the piston in two ways. First, as the piston approaches transfer shoulder 29, some air between them will be compressed, to exert a restraining force, although this usually is not enough to prevent the piston from striking shoulder 29. When it does strike the barrel, then, because the barrel is slidably mounted in the body, this contact results in an energy transfer such that the kinetic energy of the piston—piston rod assembly is partially distributed to the barrel, so the barrel and this combination now represents a larger mass with the same kinetic energy. As a consequence, the velocity of this combination is much less than the previous velocity of the piston.

At the same time, decelerator spring 23 exerts a braking effect. While the spring does not dissipate energy, it does store it, and in so doing decelerates the combination as it approaches the body. Finally, of course, the spring is fully compressed, and is a metallic body stacked between the body and the barrel. This is the ultimate contact, but in the process, the unit loading between the piston and the transfer shoulder has been reduced to the extent that the piston will not be damaged. In fact, properly designed, the device can be fired in the air, i.e. with no structure placed between the blade and the reaction arm, without serious damage to the piston.

This is a simple and remarkably effective means to protect the piston, and many firings without structure to be cut ("firing in the air") can be made without significant damage to the piston.

An electrically initiated, or mechanically initiated, or laser initiated gas-generating cartridge is given as the best example for providing gas quickly under high pressure. A high impulse drive is desired, rather than a slowly raising pressure. There do exist gas valving systems which provide high pressure gases quickly, but these require storage tanks and complicated valving. A solid propellant is a much safer and more convenient source.

In fact the availability of quick, even automatic, reloading enables this device to deliver strong, high impulse, repetitive blows at a rate which equals or exceeds the rate attainable with other types of power supplies.

This invention is not to be limited by the embodiment shown in the drawings and described in the description, which is given by way of example and not of limitation, but only in accordance with the scope of the appended claims.

We claim:

1. A rescue tool comprising:

a body with an axis of actuation and an axially-extending bore therein;

a spacer on the body extending axially, laterally spaced from said axis;

a reaction arm extending laterally from the spacer and crossing said axis;

an actuator barrel slidably fitted in said bore, said barrel having an internal cylinder which opens toward said reaction arm, an outer cylindrical section which fits in said bore, and an enlarged external section forming a retention shoulder facing said body, decelerator means placed around said barrel between said shoulder and the body;

a transfer shoulder in said internal cylinder having a diameter;

a piston fitted in said cylinder, and a piston rod extending from said piston, toward said reaction arm; said piston having a diameter larger than said transfer shoulder;

a chopper blade functionally joined to said piston rod aligned with and parallel to said reaction arm;

a cylinder head attached to said barrel closing said cylinder, said cylinder head having a cartridge chamber to receive a gas generating means;

a breech closure removably attached to said barrel to give access to said chamber; and firing means to initiate a cartridge placed in said chamber.

2. A tool according to claim 1 in which said decelerator means is a compression spring.

3. A tool according to claim 1 in which the piston strikes the transfer shoulder, prior to substantial movement of the barrel toward the reaction arm, whereby kinetic energy of the piston is partially distributed to the barrel, and the combination of piston and barrel moves toward the body, the retention shoulder compressing the decelerator means.

4. A tool according to claim 3 in which said decelerator means is a compression spring.

5. In combination:

a tool according to claim 1; and a cartridge placed in said cartridge chamber, said cartridge including a solid gas-generating charge.

6. A combination according to claim 5 in which said charge is black powder.

7. A combination according to claim 6 in which the piston strikes the transfer shoulder, prior to substantial movement of the barrel toward the reaction arm, whereby kinetic energy of the piston is partially distributed to the barrel, and the combination of piston and barrel moves toward the body, the retention shoulder compressing the decelerator means.

* * * * *